(12) United States Patent
Aguilar Monforte

(10) Patent No.: US 11,814,240 B2
(45) Date of Patent: Nov. 14, 2023

(54) VALVE FOR INJECTING AND/OR EXTRACTING FLUID FOR A WHOLESALE MERCHANDISE CONTAINER AND CONTAINER AND METHOD FOR TREATING AND/OR STORING WHOLESALE MERCHANDISE BY MEANS OF SAID VALVE

(71) Applicant: METABOL PACK, S.L., Barcelona (ES)

(72) Inventor: Carlos Aguilar Monforte, L'ametlla del Vallès (ES)

(73) Assignee: METABOL PACK, S.L., Barcelona (ES)

( * ) Notice: Subject to any disclaimer, the term of this patent is extended or adjusted under 35 U.S.C. 154(b) by 0 days.

(21) Appl. No.: 16/499,668

(22) PCT Filed: Mar. 28, 2018

(86) PCT No.: PCT/ES2018/070270
§ 371 (c)(1),
(2) Date: Sep. 30, 2019

(87) PCT Pub. No.: WO2018/178481
PCT Pub. Date: Oct. 4, 2018

(65) Prior Publication Data
US 2020/0024067 A1  Jan. 23, 2020

(30) Foreign Application Priority Data
Mar. 29, 2017 (ES) .............................. ES201700435

(51) Int. Cl.
*B65D 81/20* (2006.01)
*B65D 88/16* (2006.01)
*B65D 33/01* (2006.01)

(52) U.S. Cl.
CPC ......... *B65D 88/1668* (2013.01); *B65D 33/01* (2013.01); *B65D 81/2023* (2013.01); *B65D 88/1618* (2013.01)

(58) Field of Classification Search
CPC ............... B65D 88/16; B65D 88/1606; B65D 88/1612; B65D 88/1618; B65D 88/1625;
(Continued)

(56) References Cited

U.S. PATENT DOCUMENTS

2007/0241023 A1* 10/2007 Ootsubo .............. B65D 77/225
  206/524.8
2008/0237239 A1* 10/2008 Pham .................. B65D 77/062
  220/495.06

FOREIGN PATENT DOCUMENTS

DE  69911682  8/2004
DE  112011105729  7/2014
(Continued)

OTHER PUBLICATIONS

JP2012001249Translation (Year: 2012).*
JPH04189752ATranslation (Year: 1992).*

*Primary Examiner* — Jes F Pascua
*Assistant Examiner* — Nina K Attel
(74) *Attorney, Agent, or Firm* — Ice Miller LLP

(57) ABSTRACT

The valve comprises a fluid inlet and/or outlet duct (8) comprising a flowrate regulator element (9) and a seating (10) for said fluid inlet and/or outlet duct (8), said seating (10) including a surface (10*b*) adapted to be attached to a portion of an internal bag (4) made of flexible material in the container (1), and is characterised in that it comprises a cover (11) to protect said seating (10) and comprising a hole for access to said fluid inlet and/or outlet duct (8); said cover (11) comprising means (13, 14) for securing a protective wrapping (5) enveloping the internal bag (4) on said seating (10). The container is characterised in that it includes at least (Continued)

one valve (3a, 3b) for the injection and/or extraction of fluid, and in that a portion of said internal bag (4) made of flexible material is attached to the seating (10) of the inlet duct (8) of said valve (3a, 3b) and that a portion of the protective wrapping (5) for said internal bag (4) is held against said seating (10) by the cover (11).

10 Claims, 12 Drawing Sheets

(58) Field of Classification Search
CPC ............ B65D 88/1631; B65D 88/1637; B65D 88/1643; B65D 88/165; B65D 88/1656; B65D 88/1662; B65D 88/1668; B65D 31/14; B65D 88/1675; B65D 88/1681; B65D 88/1687; B65D 88/1693; B65D 88/18; B65D 88/20; B65D 88/22; B65D 88/24; B65D 33/01; B65D 81/2023; B65D 31/147; B65D 77/225; B65D 81/2038
USPC .................................................. 383/100–103
See application file for complete search history.

(56) References Cited

FOREIGN PATENT DOCUMENTS

| EP | 2808268 | | 12/2014 | |
|----|---------|---|---------|---|
| EP | 3088323 | | 11/2016 | |
| JP | 04189752 A | * | 7/1992 | ......... B65D 75/5877 |
| JP | 2012001249 A | * | 1/2012 | |
| WO | 2013032603 | | 3/2013 | |

* cited by examiner

VALVE FOR INJECTING AND/OR EXTRACTING FLUID FOR A WHOLESALE MERCHANDISE CONTAINER AND CONTAINER AND METHOD FOR TREATING AND/OR STORING WHOLESALE MERCHANDISE BY MEANS OF SAID VALVE

CROSS-REFERENCE TO RELATED PATENT APPLICATIONS

This is a U.S. National Phase Application under 35 U.S.C. § 371 of International Patent Application No. PCT/ES2018/070270, filed Mar. 28, 2018, and claims priority to Spanish Patent Application No. P201700435, filed Mar. 29, 2017, which is incorporated by reference in its entirety. The International Application was published on Oct. 4, 2018, as International Publication No. WO 2018/178481 A1.

The present invention relates to a valve for the injection and/or extraction of fluid, for use with a container for the treatment and/or storage of goods sold in bulk. Specifically, the present invention relates to a container for goods, with a capacity equal to or greater than 200 kg, and comprising at least one valve for the injection and/or extraction of fluid into or from the container for the purpose of treating the goods stored therein.

BACKGROUND OF THE INVENTION

In the industrial sector, the use of containers for goods sold in bulk is common; said containers comprising at least one internal bag made of flexible material and a protective wrapping made of raffia, cardboard or plastic. These containers are known commercially as "big-bags" or "octabins". These containers made of flexible material are cheaper than rigid containers made of plastic or metal, require only a small amount of space and are generally single-use.

The internal bags made of flexible material of the containers described in the previous paragraph, known commercially as "liners", feature materials with limited permeability to oxygen or damp, and are configured so as to preserve or treat the goods stored therein. These bags are in contact with the goods and are susceptible to be sealed in order to ensure the stability of the atmosphere within the container.

Patent EP2808268 discloses a container for goods sold in bulk of the type described, comprising one valve for the extraction of gas and another valve for the injection of gas into the internal bag made of flexible material. The injection or extraction of gas is performed by means of equipment installed in a line for the filling and packaging of goods which incorporates an element for its interconnection with the valves of the container.

The valves described in patent EP2808268 comprise a fluid inlet and/or outlet duct equipped with a flowrate regulator element and a seating for the fluid inlet and/or outlet duct including a surface whereon a portion of the internal bag made of flexible material is joined by welding. These valves require the use of an external clamping disc comprising a clip for the anchoring of the seating of the fluid inlet and/or outlet duct to the protective wrapping of the container which encloses the internal bag or "liner".

The container of patent EP2808268 presents the drawback that the aforementioned external disc which clamps the valve seating to the protective wrapping remains exposed on the protective wrapping of the container, complicating the handling of said container and weakening the join between the protective wrapping and the internal bag during transport.

In view of the above, the need to provide a robust, easily-handled container for the treatment and/or storage of goods sold in bulk becomes evident.

DESCRIPTION OF THE INVENTION

The object of the present invention is to solve the aforementioned drawbacks, furnishing a fluid injection and/or extraction valve and a container for goods sold in bulk, presenting the advantages to be described below.

The valve claimed is particularly useful for the treatment of solid foodstuffs within "Big-Bag" containers with a protective wrapping of cardboard or of synthetic or natural fibre.

In accordance with this objective, in a first aspect, the present invention provides a fluid injection and/or extraction valve comprising a fluid inlet and/or outlet duct provided with a flowrate regulator element and a seating for said fluid inlet and/or outlet duct, said seating comprising a surface adapted to be attached to a portion of an internal bag made of flexible material within the container. The valve is characterised in that it comprises a cover for the seating; said cover comprising an access hole to said fluid inlet and/or outlet duct, and in that the cover comprises a means for securing a protective wrapping of the internal bag on said seating.

In the valve claimed, the fluid inlet and/or outlet duct is disposed on a seating that is covered and protected by the cover during use. Thus, the join between the internal bag made of flexible material and the seating is protected by the cover. Indeed, in the present invention, a portion of the protective wrapping of the container may be clamped between the cover and the seating, thus contributing to ensure a highly resistant join between the valve and the container, both components of the container thus being integrated. The access hole in the cover enables access to the fluid inlet and/or outlet duct, which is located within the container.

The design of the valve of the present invention presents the advantage that the essential components of the valve are integrated in the container, providing a high resistance to shocks and stresses, resulting in greater ease of transport of the container once full. Current containers feature a single valve located at the upper part of the container in order to prevent damage thereto during transport. The valve of the present invention may be located at different points of the container with no risk of damage during transport, as the valve components are integrated within the container, protected by the cover.

Advantageously, the fluid inlet and/or outlet duct is sized to receive an element for its interconnection with a fluid injection and/or extraction device. This interconnection element may be attached to the valve cover by anchoring means disposed on the upper side of the cover to enable a bayonet-type connection with said element. However, alternatively, this interconnection element may be attached directly to the fluid inlet and/or outlet duct by an anchoring means arranged at the extremity of said duct, to enable a bayonet-type connection with the interconnection element. In this way, the interconnection element is anchored in the interior of the valve, this type of attachment being highly resistant, strong and safe.

Preferably, the seating of the fluid inlet and/or outlet duct comprise a base which is coaxial to the fluid inlet and/or outlet duct, said coaxial base defining a surface adapted to be attached to the internal bag made of flexible material.

For example, a circular portion of the outline of a hole executed in the internal bag made of flexible material may be attached by welding to said surface of the coaxial base of the fluid inlet and/or outlet duct seating.

Again preferably, the fluid inlet and/or outlet duct is attached to the coaxial base of the seating in such a way that one extremity of the fluid inlet and/or outlet duct emerges from the upper side of the coaxial base, to become disposed in correspondence with the access hole in the cover.

In this way, simple access is obtained via the hole in the cover to the fluid inlet and/or outlet duct with the interconnection element of a fluid injection and/or extraction device.

In accordance with a preferred embodiment, the means for securing the protective wrapping comprise a cover affixing body extending from the lower side of the cover to enter into contact, in its normal-use position, with a portion of the wrapping disposed on the seating, said affixing body including an anchoring element arranged to cooperate with a complementary anchoring element of the seating or of the fluid inlet and/or outlet duct.

In this way, a portion of the protective wrapping becomes clamped between the cover affixing body and the valve seating, ensuring an optimal anchoring between the cover and the base which includes the seating and the fluid inlet and/or outlet duct. Furthermore, the protective wrapping is thus held against the valve seating and at the same time is protected by the cover.

Advantageously, and in accordance with the same preferred embodiment of the valve, the fluid inlet and/or outlet duct is attached to the seating in such a way that one extremity of the duct emerges from the upper side of the seating, to become disposed in correspondence with the cover access hole, the extremity of said duct comprising a ring-shaped flange that acts by way of a anchoring element that is complementary to a anchoring element of the affixing body.

Preferably, in accordance with the same preferred embodiment, the cover of the valve comprises a portion which is coaxial to the access hole in the fluid inlet and/or outlet duct, including a substantially concave profile that is susceptible to adapt to the shape of the container when full.

It has been observed that the concave profile of the cover facilitates the securing of the protective wrapping against the internal bag made of flexible material, eliminating stresses that might cause tears in the flexible material.

In accordance with an alternative embodiment, the securing means of the protective wrapping against the internal bag made of flexible material comprise at least one projection disposed on the seating of the fluid inlet and/or outlet duct, arranged to cooperate with at least one recess provided in the cover, said projection being susceptible to traverse the protective wrapping clamped between the cover and the seating and to be inserted into the recess.

This embodiment likewise ensures a highly resistant join between the internal bag and the protective wrapping to the seating of the valve, this join likewise being protected by the cover.

Advantageously, and in accordance with the same alternative embodiment, the securing means of the protective wrapping comprise a plurality of lugs distributed around the fluid inlet and/or outlet duct, on a surface of the seating which encircles said fluid inlet and/or outlet duct.

Preferably, the valve comprises a plug for the blocking of the hole in the cover which gives access to the fluid inlet and/or outlet duct and, advantageously, said plug includes a fastening strap joined to the cover, and additionally, attaching means to the fluid inlet and/or outlet duct configured so as to define a first pre-closure position, and a second position wherein the plug is closed over the extremity of said duct.

In the first pre-closure position, the plug is attached to the extremity of the fluid inlet and/or outlet duct in order to prevent the ingress of dust into the container during transport and delivery to the facility where its filling is to be carried out. Once the treatment is complete, the plug is coupled in its second, closed position, wherein it is totally seated in the fluid inlet and/or outlet duct in order to ensure the airtightness and sealing of the container.

In accordance with a preferred embodiment, the valve flowrate regulator element comprises at least one membrane of elastomeric material provided with means for being removably attached to a transverse wall within the fluid inlet and/or outlet duct, said membrane being susceptible to blocking a number of orifices in said transverse wall in order to prevent the flow of fluid when it adheres to said wall.

Preferably, said membrane is attached to a wall of a supporting core susceptible to be press-fitted into the interior of the fluid inlet and/or outlet duct. This membrane supporting core becomes housed within the duct by press-fitting, securing the positioning of a filter disposed at the lower extremity of said duct.

Advantageously, said membrane comprises a stud to be removably inserted into an orifice in the transverse wall within the fluid inlet and/or outlet duct.

When it is desired to extract fluid from within the container, the membrane is disposed on the upper side of the transverse wall within the fluid outlet duct, in such a way that the force of the flow of the gas drawn through the orifices in the transverse wall raises the membrane, in order to enable the egress of gas through the duct. However, when it is desired to inject fluid into the container, the membrane is disposed beneath the transverse wall within the fluid inlet duct in such a way that the force of the flow of the gas entering through the orifices in the transverse wall raises the membrane, in order to enable the passage of the fluids into the container. In order to prevent errors, the cover over the seating is always marked in order to identify whether it is configured as a fill valve or a vacuum valve.

In accordance with one embodiment, the seating of the fluid inlet and/or outlet duct is provided with a wall comprising an orifice for the access of a sample probe to the interior of the container, and an element of elastomeric material configured to block said orifice, said probe being susceptible to traverse a portion of the internal bag made of flexible material which covers said orifice and the element made of elastomeric material. However, in accordance with an alternative embodiment, the sample probe is foreseen in an interconnection element of a fluid injection and/or extraction device coupled to the fluid inlet/outlet duct.

Advantageously, the valve comprises a filter disposed at the extremity of the fluid inlet and/or outlet duct. In accordance with one embodiment, said filter is disposed on a support which is attachable to the extremity of said duct. However, in accordance with an alternative embodiment, the filter is disposed on an internal flange of the fluid inlet and/or outlet duct. This filter is necessary when fluid is extracted or drawn out, to prevent the ingress of dust into the equipment or the fluid extraction or injection device.

Preferably, the valve comprises means for the detection of the presence of said interconnection element when said interconnection element is attached to the fluid inlet and/or outlet duct, said detection means being susceptible to send a halt signal to a processing and control unit of the fluid extraction or injection device when said interconnection element is detached from the fluid inlet and/or outlet duct.

In accordance with a second aspect, the present invention relates to a container for the treatment and storage of goods sold in bulk, comprised of at least one internal bag made of flexible material and a protective wrapping for said internal bag, and is characterised in that it includes at least one fluid injection and/or extraction valve such as that claimed, a portion of the internal bag made of flexible material being attached to the valve seating and a portion of the protective wrapping for the internal bag being clamped between the seating and the cover protecting said seating.

The present invention provides a container for the treatment and/or storage of goods sold in bulk which is highly robust and easy to handle, as the join between the internal bag made of flexible material and the seating is protected by the cover. Furthermore, in the container claimed, a portion of the protective wrapping of the bag is clamped between the cover and the seating, contributing to ensure an integrated and highly resistant joint between the bag with the protective wrapping and the valve, enabling said valve to be installed at any part of the container in order to achieve a better sweep of the fluid.

Advantageously, at least one portion of said internal bag is welded to a surface of the valve seating disposed coaxially to the fluid inlet and/or outlet duct, said portion of the internal bag being susceptible to be protected by the cover of the seating in the normal-use position of the container.

In accordance with a preferred embodiment, the internal bag made of flexible material comprises at least one layer of flexible material with a permeability configured to maintain the composition of the atmosphere within the container substantially constant during a predetermined time. One or more layers of flexible material may be combined to provide the desired permeability. These layers of material are available on the market, and are sold under the name of "liners" or "barrier liners".

Preferably, one or several layers of the flexible material forming the internal bag features a permeability to oxygen of between 150 ml/m$^2$ and 0.01 ml/m$^2$ over 24 h, and/or a permeability to humidity of between 10 g/m$^2$ and 0.01 g/m$^2$ over 24 h.

For example, the internal bag or "liner" comprises at least one layer configured by a polyethylene sheet whose permeability to oxygen is between the aforementioned values. Additionally, the internal bag may include a second layer of flexible material, such as (for example) a layer or sheet of aluminium configured with a permeability to humidity of between the aforementioned values. Optionally, the layer or sheet of polyethylene may be replaced or covered by a sheet of polyamide, with a greater mechanical resistance than that of polyethylene. This layer is useful when products with sharp edges are stored.

Again preferably, the protective wrapping of the bag includes at least one layer of fabric made of synthetic or natural fibre, said layer of fabric being susceptible to be traversed by at least one projection disposed on the seating of the valve claimed, or to be clamped over the seating by the cover affixing body. This layer of fabric may be, for example, a fabric including raffia made of polypropylene or a thread obtained by the extrusion of polyolefins.

Alternatively, the protective wrapping of the bag may include at least one layer of cellulose material, or may be constituted of cellulose material, such as cardboard, said cellulose material being susceptible to be traversed by at least one lug disposed on the seating of the valve claimed, or to be clamped over the seating by the cover affixing body.

For example, the protective wrapping may be configured of cardboard with thicknesses of between 7 mm and 12 mm.

In accordance with one embodiment, the container comprises at least two fluid injection and/or extraction valves, one of said valves including a flowrate regulator element configured for the extraction of fluid from the container, and the other valve a flowrate regulator element configured for the injection of fluid into the container. These two valves may be used at the same time for the simultaneous injection and extraction of fluids.

Advantageously, when the protective wrapping is made of flexible material, the container may comprise a ring-shaped element that is coaxial to the seating of each of the valves, intended for the elimination of stresses and to prevent the occurrence of tears in the internal bag or "liner". For example, this stress-preventing ring may consist of a flexible plastic strip sewn on the protective wrapping on the exterior of the container, encircling the cover and the seating of each valve.

The container provided by the present invention presents the advantage that it enables the in-line extraction and/or injection of fluid, without cycles, as the flow that can circulate through the fluid inlet and/or outlet duct is much greater than that of the valves in the state of the art. The combination of characteristics claimed for the valve enables the passage of high flowrates with no risk of blockages in the fluid inlet and/or outlet duct.

In accordance with a second aspect, the present invention provides a process for the treatment of goods sold in bulk and previously enclosed in flexible material packaging including an internal bag which is in direct contact with said goods. This process involves the steps of;

a) coupling the interconnection element of a fluid injection and/or extraction device to a fluid inlet and/or outlet duct of a valve, or to a cover of said valve, b) creating a total or partial vacuum within the hermetically sealed container or bag once said container is full, extracting air or fluid via a valve such as that claimed, until a certain level of vacuum is achieved, c) injecting fluid via a valve such as that claimed, which is incorporated in the container or bag itself, d) while the injection of fluid is being performed, obtaining a sample, and analysing in real time the composition of the air or fluid within the container, e) if the composition is not as predetermined, keeping on injection, otherwise, halting injection and closing valves.

The sample in step c) may be taken by means of a probe inserted through the hole foreseen for this purpose in the valve seating, said probe being susceptible to traverse the internal bag covering the hole and welded to the seating. However, alternatively, the same sample may be taken by means of a measuring probe incorporated in the interconnection element of the fluid injection and/or extraction device. This same interconnection element may incorporate a pressurestat and a vacuostat to measure the fluid inlet and outlet pressure.

Preferably, the injection of fluid in step b) is performed via a first valve, and the extraction of air or fluid is performed via a second valve, said valves being located in different positions on the same container.

BRIEF DESCRIPTION OF THE FIGURES

For the purpose of facilitating the foregoing description, a set of drawings is attached wherein, schematically and solely by way of a non-limitative example, two practical embodiments of the valve and container of the invention are portrayed, wherein.

DESCRIPTION OF PREFERRED EMBODIMENTS

A first embodiment of the valve and container of the present invention is described below, with reference to FIGS. 1 to 7, and further below, a second embodiment of the valve of the same invention is described, with reference to FIGS. 8 to 14.

Figure 1:
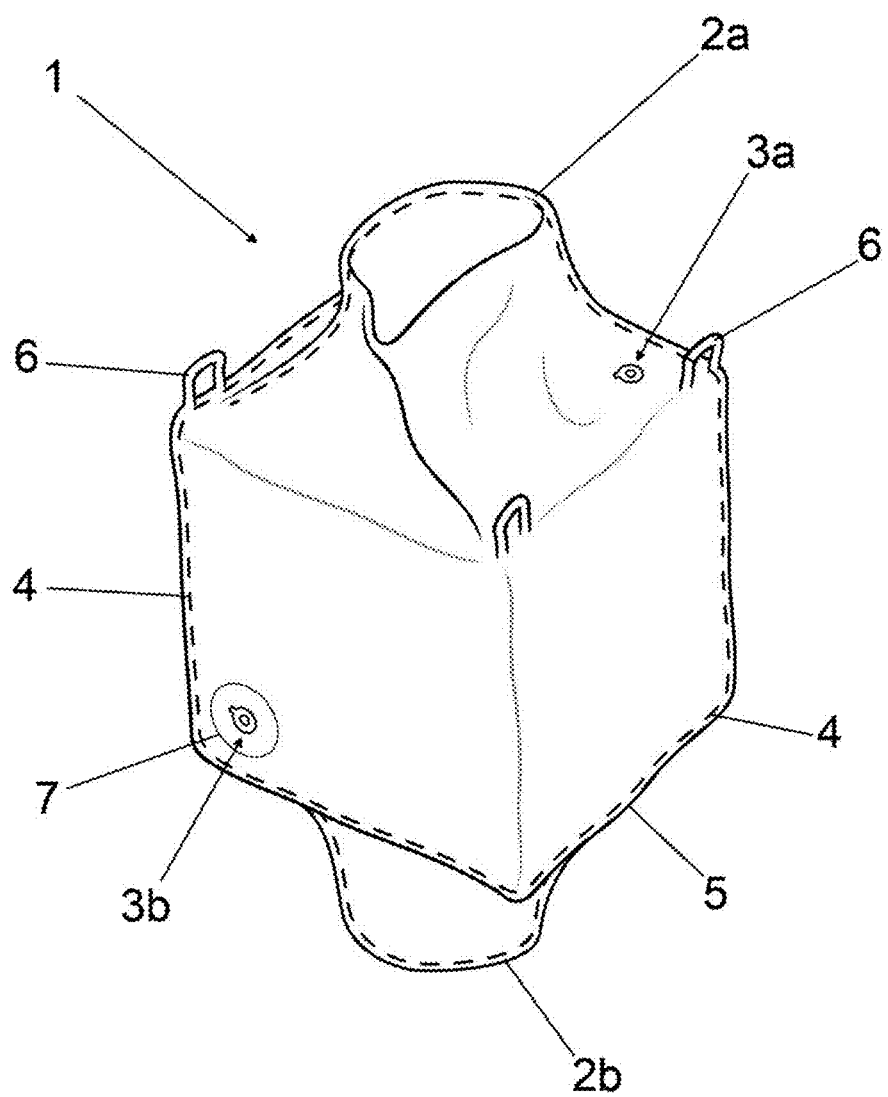
FIG. 1 is a perspective view of the container for the treatment and/or storage of goods sold in bulk of the present invention.

FIG. 1 portrays a container 1 for the treatment and/or storage of goods sold in bulk and including a goods fill opening 2a and a goods discharge opening 2b, two valves 3a, 3b for the injection and/or extraction of fluid, located at different points of the container 1. The container 1 in itself features an internal bag 4 made of flexible material and a protective wrapping 5 for the internal bag 4. As may be seen in FIG. 1, the valve 3b located on the body of the covering and distant from the handles 6 of the container 1, includes a stress-preventing ring 7 sewn to the protective wrapping 5, encircling the valve 3b to prevent tearing when the container 1 is handled.

Figure 7:
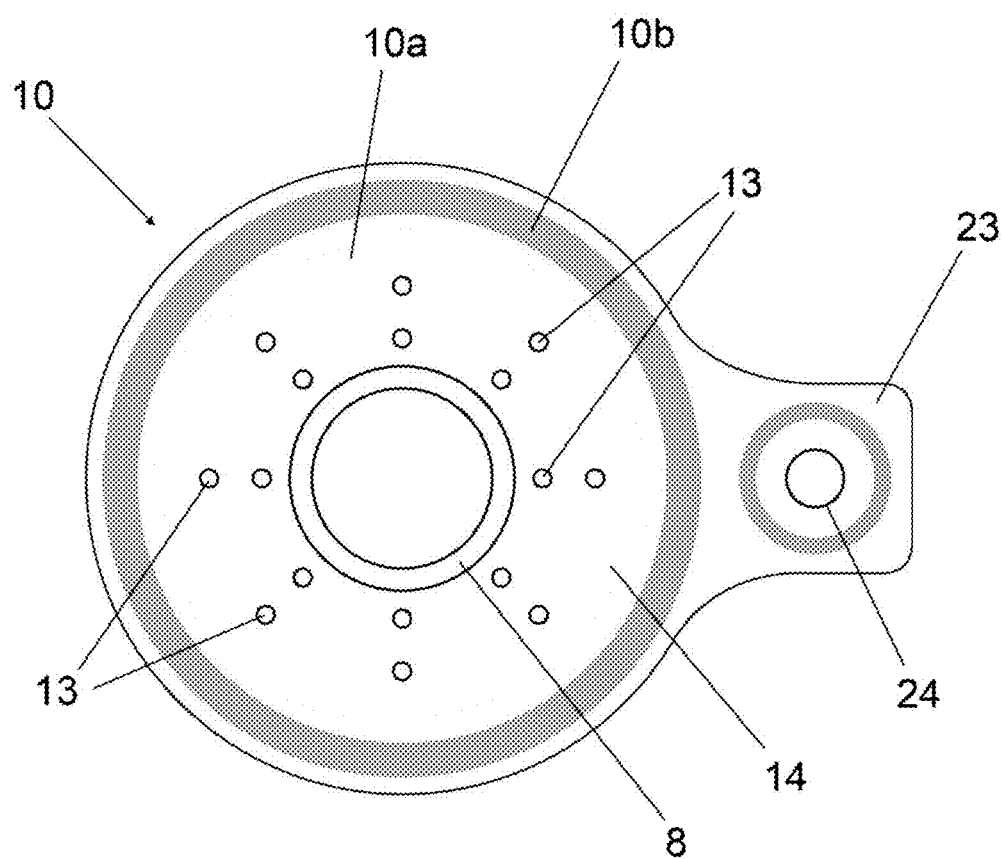
FIG. 7 portrays a schematic plan view of the valve seating.

FIGS. 2 to 4 and 7 portray different views of a first embodiment of the valve 3a, 3b claimed, comprising a fluid inlet and/or outlet duct 8 comprising a flowrate regulator element 9 and a seating 10 for said fluid inlet and/or outlet duct 8 comprising a coaxial base 10a comprising a surface 10b adapted for its attachment to a portion of the internal bag 4 made of flexible material of the container 1, for example by the welding of the two materials (see FIG. 7).

In the embodiment described, the seating 10 of the fluid inlet and/or outlet duct 8 includes a wall 23 equipped with an orifice 24 for the access of a sample probe (not portrayed) into the container 1. FIG. 7 portrays a plan view of the wall 23 and the orifice 24 through which the aforementioned probe is inserted. The orifice 24 is covered upperly by the internal bag 4 made of flexible material and inferiorly by a plug made of polyurethane rubber or any other elastomeric material configured to block the orifice 24 once the probe is removed.

In addition to the aforementioned seating 10, the body of the valve 3a, 3b includes a cover 11 to protect said seating 10, comprising an access hole 12 to the fluid inlet and/or outlet duct 8. As may be seen in FIGS. 3 and 4, this cover 11 features a plurality of projections 13 distributed around the fluid inlet and/or outlet duct 8 on a surface of the coaxial base 10a of the seating 10 which encircles said duct 8. The projections 13 are arranged to cooperate with a number of recesses 14 featured on the internal side of the cover 11, in such a way that said projections 13 may traverse a portion of the protective wrapping 5 to become inserted into the recesses 14, thus securely clamping the protective wrapping 5 between the seating 10 and the cover 11. In the final normal-use position of the valve 3 portrayed in FIG. 2, the cover 11 extends over the seating 10, protecting the join between the internal bag 4 and the seating 10, and at the same time grasping the protective wrapping 5.

Figure 2:
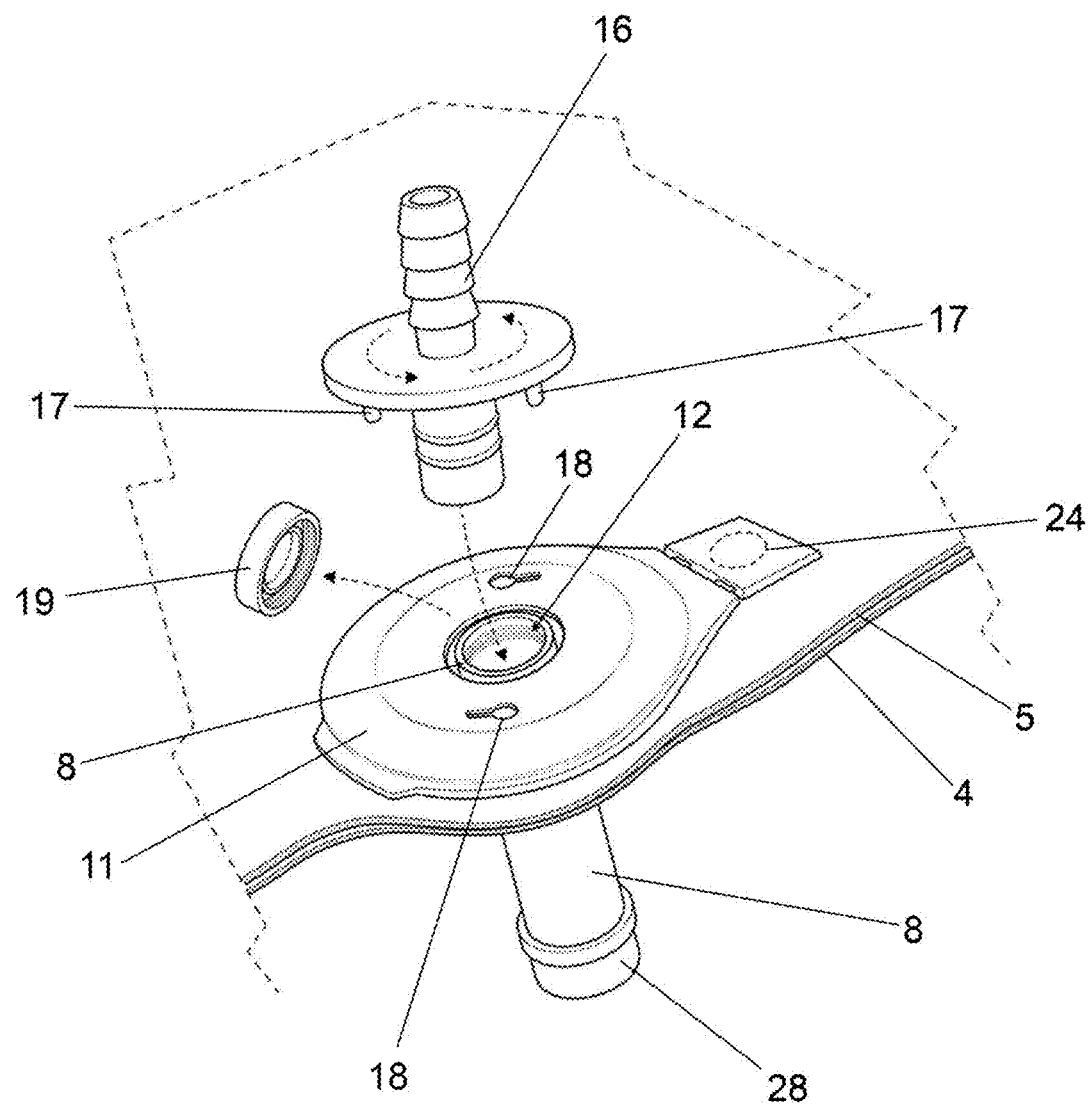
FIG. 2 is a schematic perspective view of a valve of the present invention and of the interconnection element of an injection and/or extraction device or equipment of a container filling or treatment line.
Figure 3:
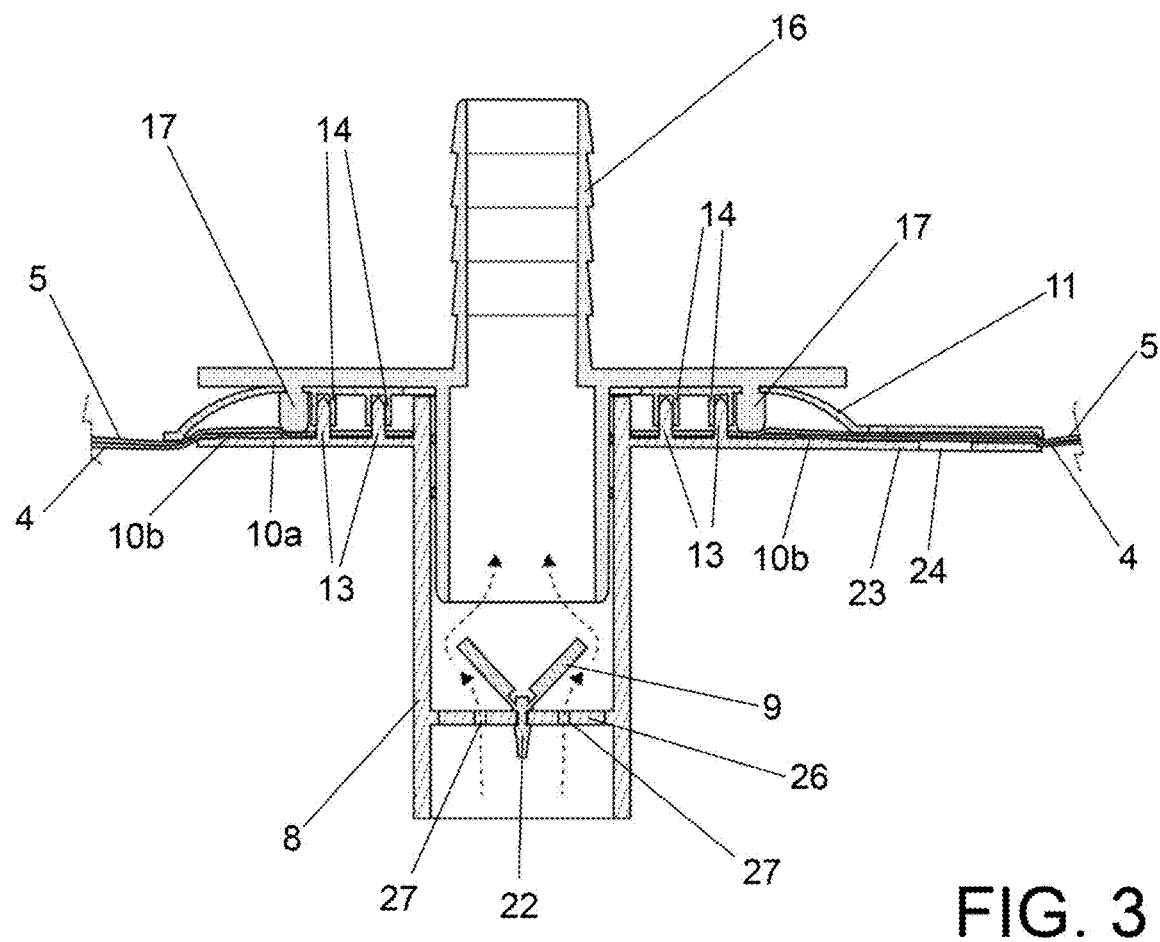
FIG. 3 portrays a cross-section of a valve of the present invention, with an interconnection element of the aforementioned fluid injection equipment or device attached.

As may be seen in FIGS. 2 and 3, the cover 11 of the valve 3a, 3b features a hole 12 for access to the fluid inlet and/or outlet duct 8 for the attachment of an interconnection element 16 to the gas or fluid injection and/or extraction device or equipment of a product filling and packaging line. This element 16 is coupled to the upper side of the cover 11 by means of a number of projections 17 which engage in a bayonet-type joint with a number of recesses 18 featured on the cover 11. On completion of the injection or extraction of fluid, a plug 19 is disposed at the upper extremity of the fluid inlet and/or outlet duct 8 which emerges from the upper side of the coaxial base 10a and is disposed in correspondence with the access hole 12 of the cover 11.

Figure 5A:
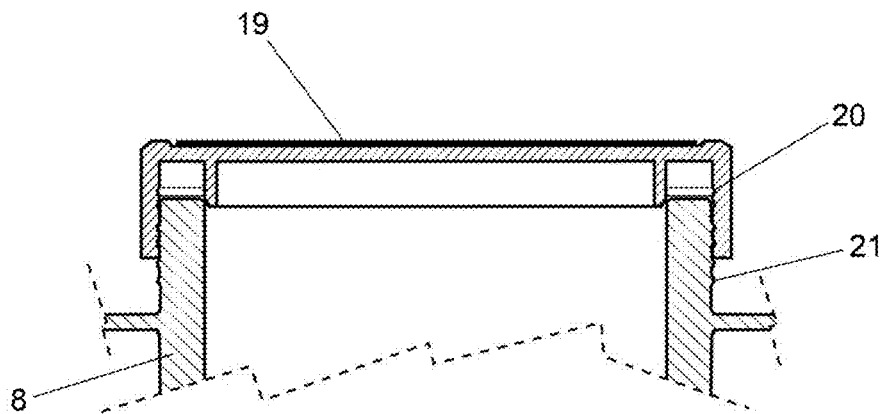
FIGS. 5a and 5b portray two cross-sections of a plug disposed at the external extremity of the fluid inlet and/or outlet duct of the valve, in a first and second closed position, respectively.
Figure 5B:
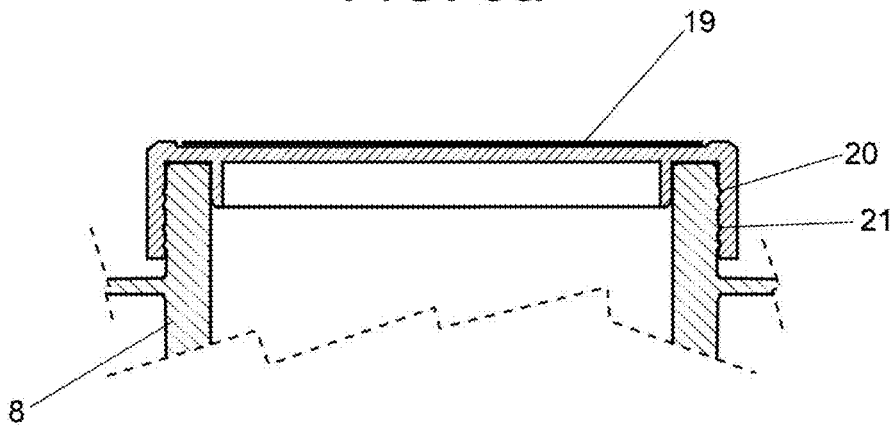
Figure 6:
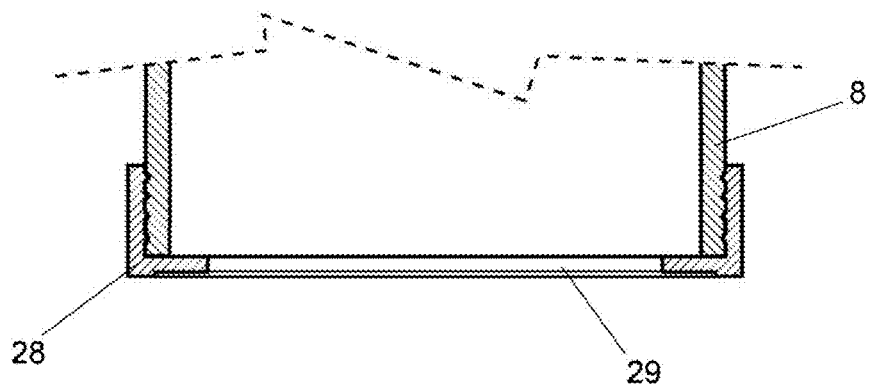
FIG. 6 portrays a cross-section of a support and filter disposed at the internal extremity of the fluid inlet and/or outlet duct of the valve.

The blocking plug 19 comprises on its internal wall a number of grooves 20 which attach to a number of protrusions 21 on the external wall of the fluid inlet and/or outlet duct 8, determining two positions of closure (see FIGS. 5a and 5b). In a first position, portrayed in FIG. 5a, the plug 19 is attached to the extremity of the fluid inlet and/or outlet duct 8 in a provisionally closed or pre-closed position, preventing the ingress of dust and foreign matter into the container 1 prior to the injection of fluid into or extraction thereof from its interior. In a second closed position, portrayed in FIG. 5b, the same plug 19 is adjustedly inserted into the extremity of the fluid inlet and/or outlet duct 8 to ensure the airtightness of the atmosphere within the container and the tamper-proof condition of the valve 1.

FIG. 3 portrays the fluid flowrate regulator element 9 of the valve 3a, 3b which, in the embodiment described, is configured by an elastomeric membrane comprising a stud 22 to be removably inserted into a hole 25 in the transverse wall 26 within the fluid inlet and/or outlet duct 8. Said transverse wall 26 features a pair of holes 27 for the passage of fluid. In a resting position, the membrane adheres to the transverse wall 26, blocking the passage of fluid.

Figure 4:
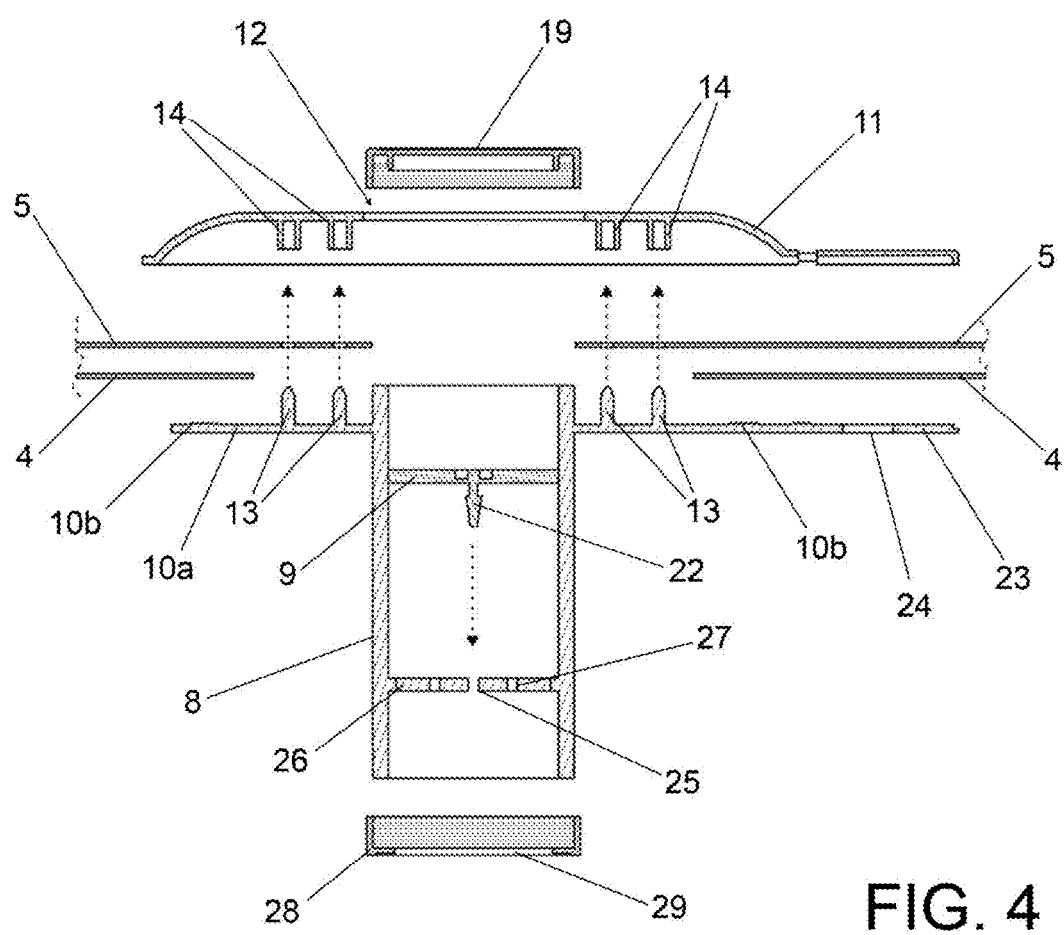
FIG. 4 portrays an exploded view of the valve in FIG. 2.

In FIG. 3, the membrane has been portrayed attached to the upper side of the transverse wall 26, in such a way that the force of the gas aspirated through the holes 27 raises the membrane in order to enable the egress of the gas aspirated via the fluid inlet and/or outlet duct 8. FIG. 4 portrays a support 28 that is attachable to the internal extremity of the fluid inlet and/or outlet duct 8 which is equipped with a filter 29 that prevents the ingress of material and/or dust into the fluid extraction equipment or device.

As has been mentioned in the description of the invention, the container 1 claimed comprises an internal bag 4 or "liner" for the sale of bulk goods, comprising one or several layers or sheets made of flexible material, for example a sheet of polyethylene and/or a sheet of aluminium. At least one of said sheets features a permeability suited to maintain the composition of the atmosphere within the container 1 substantially constant during a predetermined time, subsequent to the injection of the gas and the closure of the valves 3a, 3b. This internal bag 4 or "liner" is in direct contact with the goods and is attached to a protective wrapping 5 which may also be made of flexible material or of a semi-rigid material such as cardboard.

Figure 8:
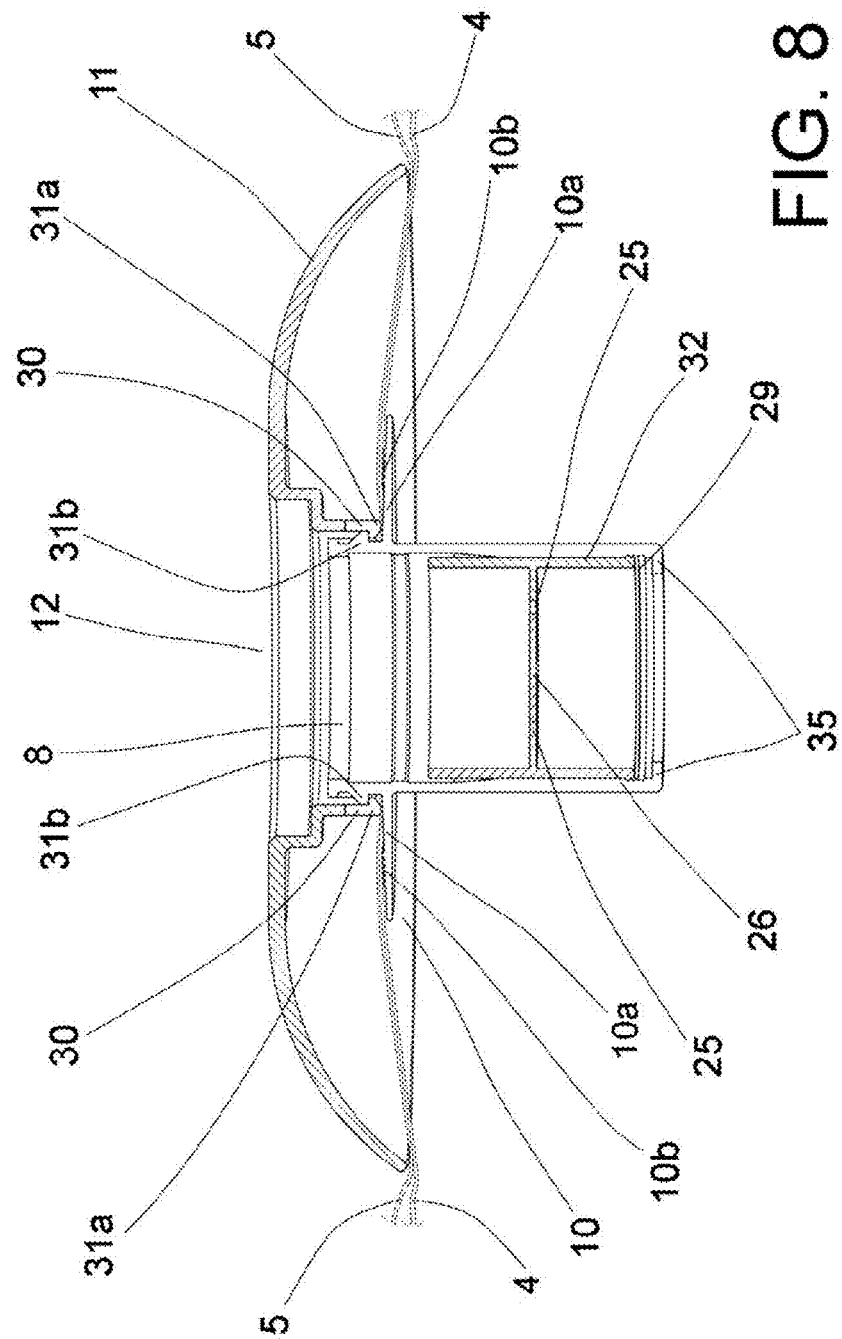
FIG. 8 portrays a cross-section of a second embodiment of the valve of the present invention, attached to the covering and the internal bag made of flexible material of a container for goods sold in bulk, such as that portrayed in FIG. 1.
Figure 9:
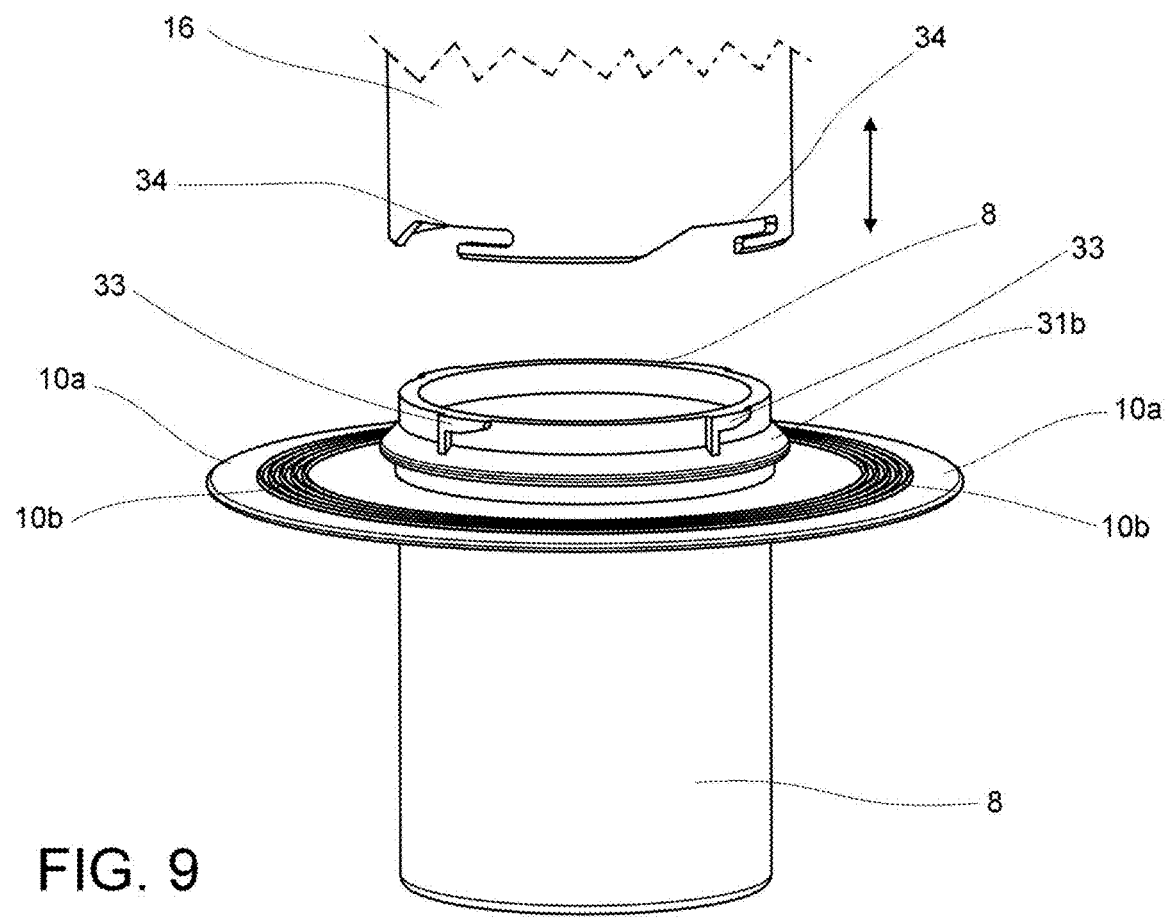
FIG. 9 is an exploded perspective view portraying the fluid inlet and/or outlet duct of the valve attached to the coaxially-based seating of the embodiment of the valve in FIG. 8, and the final stretch of an interconnection element which attaches to the extremity of the fluid inlet and/or outlet duct by means of a bayonet-type connection.
Figure 10:
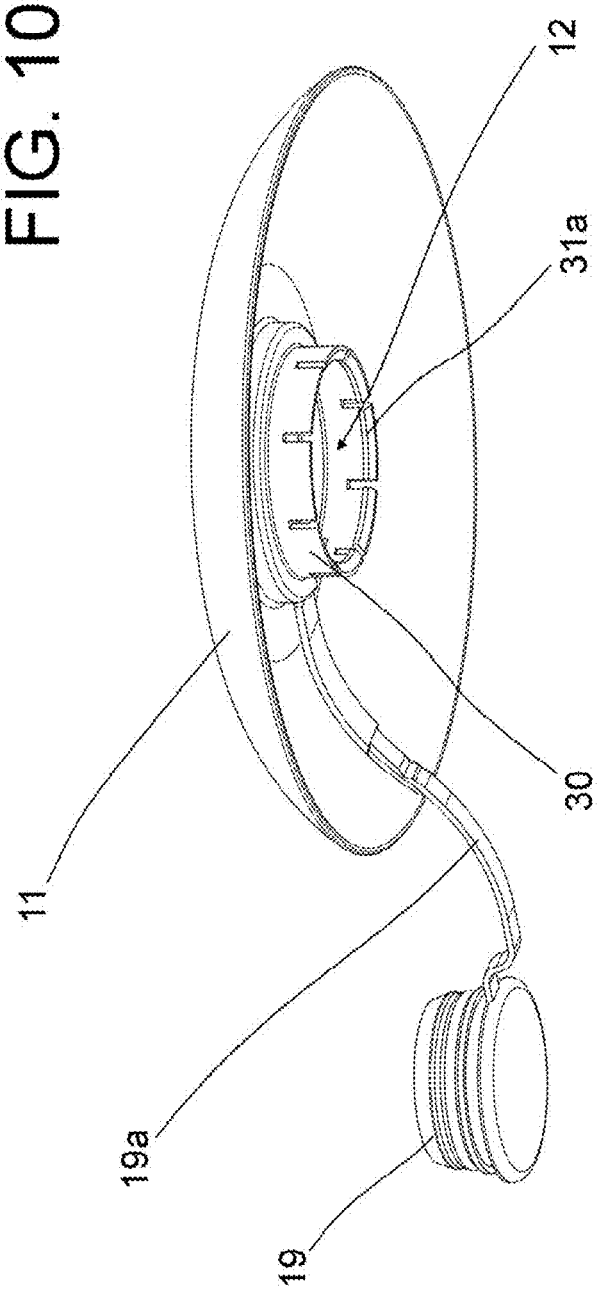
FIG. 10 is a perspective view of the lower side of the cover of the valve in FIG. 8, portraying the crown-shaped anchoring element featured on its lower side.
Figure 11:
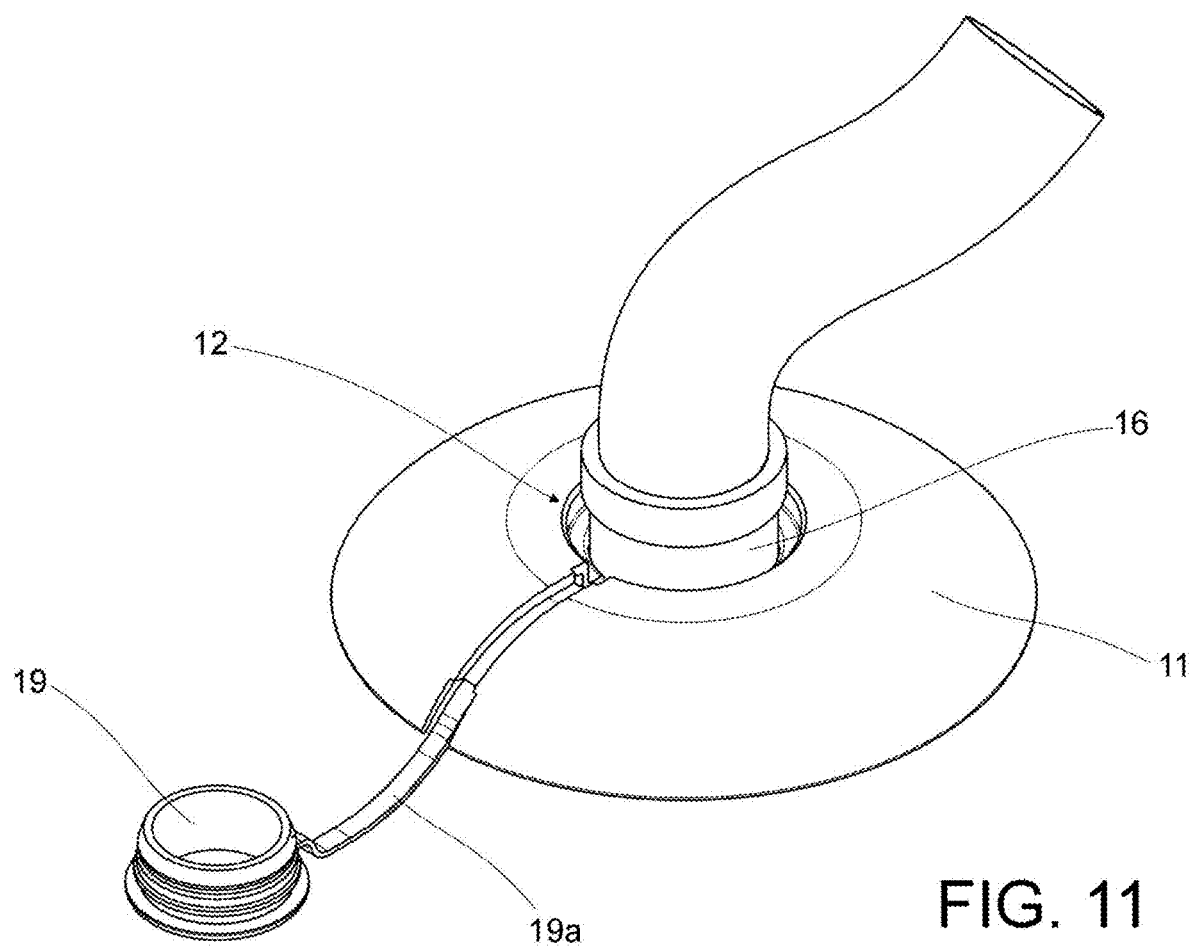
FIG. 11 is a perspective view of the embodiment of the valve in FIG. 8, with an interconnection element of a fluid injection equipment or device attached to the upper extremity of the fluid inlet and/or outlet duct.
Figure 12:
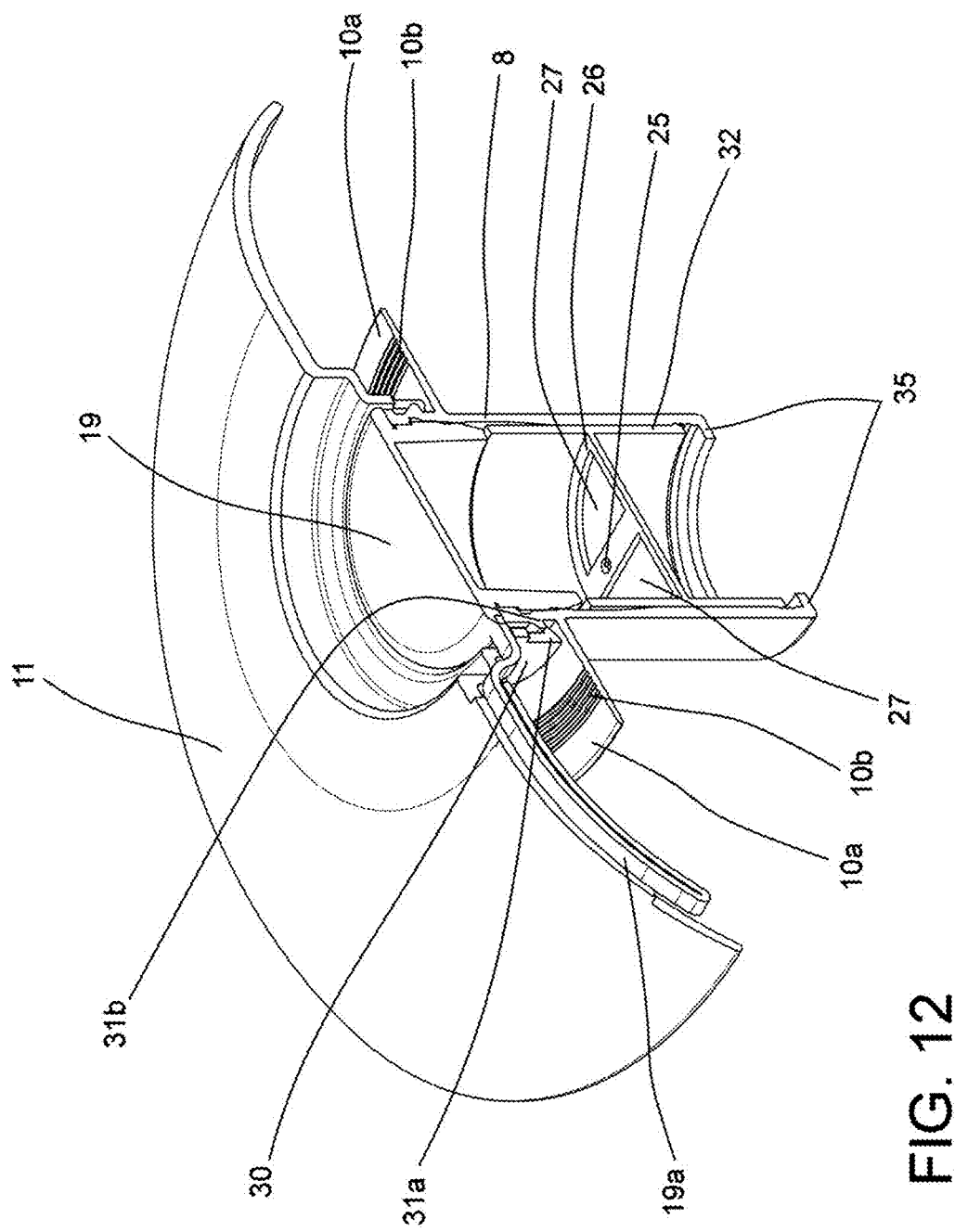
FIG. 12 portrays a perspective view of a cross-section of the embodiment of the valve in FIG. 8, with the plug in the closed position.
Figure 13:
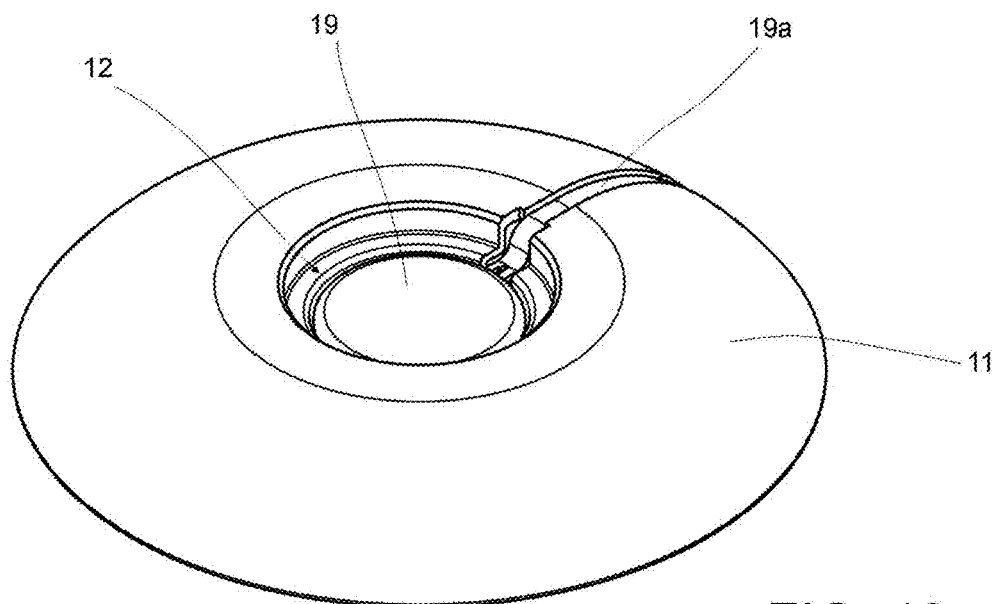
FIG. 13 portrays a complete perspective view of the embodiment of the valve in FIG. 8, with the plug in the closed position.
Figure 14:
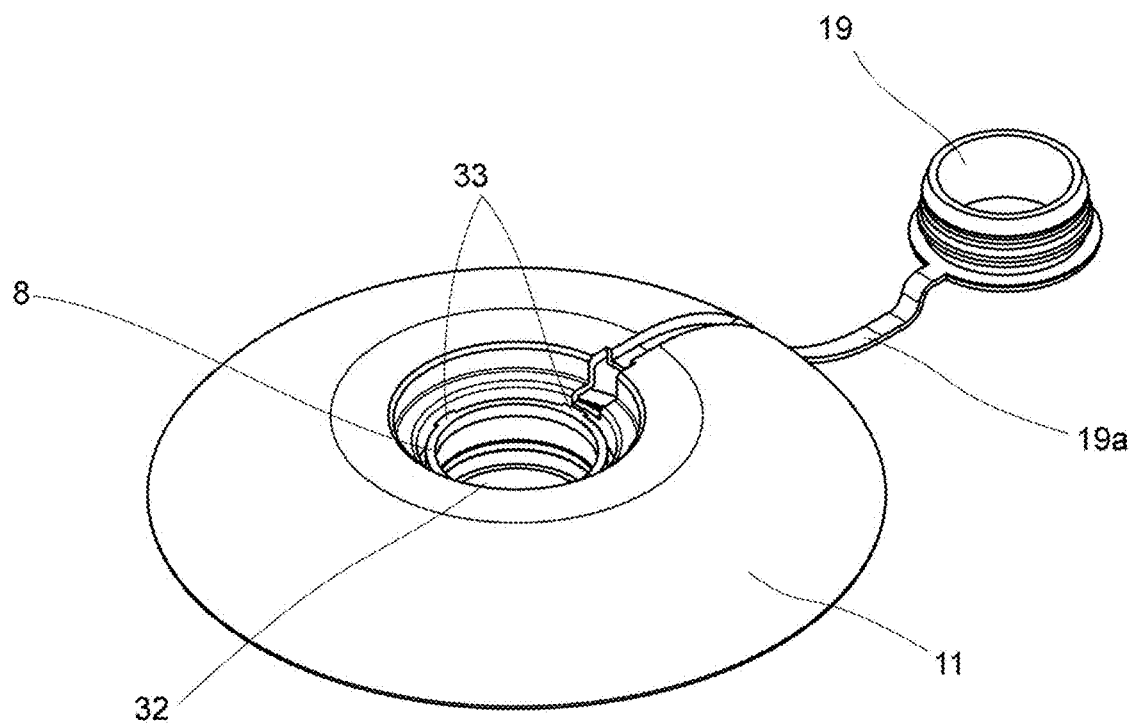
FIG. 14 portrays a perspective view of the embodiment of the valve in FIG. 8, with the plug in the open position and the valve cover anchored in the fluid inlet and/or outlet duct.

FIGS. 8 to 14 portray a second embodiment of the valve of the present invention. In this embodiment, the valve features an affixing body 30 stretching from the lower side of the cover 11 to enter, in the normal-use position, into contact with a portion of the wrapping 5 foreseen over the seating 10 (see FIG. 8). This affixing body 30 features an anchoring element 31a configured in the shape of an anchoring crown arranged to cooperate by clipping with another anchoring element 31b in the form of a ring-shaped flange disposed at the extremity of the fluid inlet and/or outlet duct 8 of the valve. FIG. 10 is a perspective view portraying the aforementioned crown-shaped anchoring element 31a of the cover 11, while FIG. 9 is another perspective view portraying the complementary ring-shaped anchoring flange foreseen at the extremity of the fluid inlet and/or outlet duct 8. In the normal-use position of this second embodiment of the valve, a portion of the protective wrapping 5 of the container is clamped between the affixing body 30 of the cover 11 and the seating 10 of the valve, ensuring an optimal anchoring that furthermore is protected by the body of the cover 11 itself.

Returning to FIG. 10, this figure portrays the extremity of the fluid inlet and/or outlet duct 8 of the second embodiment of the valve, incorporating a bayonet-type anchoring means 33 disposed to cooperate with complementary anchoring means 34 foreseen on an interconnection element 16 of a fluid injection and/or extraction device. Thus, in this second embodiment, the interconnection element 16 is locked to an internal element of the valve, ensuring a highly resistant, strong connection (see FIG. 11).

The body of the cover 11 of the second embodiment of the valve presents the characteristic that it includes a strap 19a for the fastening of the plug 19 that closes the access hole 12, and a coaxial portion with a substantially concave profile (see FIGS. 8 and 10). As may be seen in FIG. 8, the concave profile, in its normal-use position, enables the external edge of the cover 11 to enter into contact with the protective wrapping 5, securing it against the internal bag 4 made of flexible material, contributing to eliminate stresses that might cause tears in the flexible material during the transport of the container 1.

The second embodiment of the valve includes a part by way of a supporting core 32 for the elastomeric membrane 9 of the valve. As may be seen in FIGS. 8 and 12, this supporting core 32 is an independent part to be press-fitted into the interior of the fluid inlet and/or outlet duct 8, facilitating the positioning of the filter 29 of the valve on an internal flange 35 at the extremity of said duct 8.

The operation of the container 1 and the valve 3a, 3b claimed is described below.

As has been mentioned, the goods is packaged beforehand at a conventional filling and packaging line, proceeding with the hermetic sealing of the container 1, for example by means of heat-sealing applied to a number of polyethylene sheets forming part of the internal bag 4 of the container 1.

Once the container 1 is hermetically sealed with the goods in its interior, one proceeds with the extraction of air from the internal space of the container 1 by means of the air extraction unit of the fluid injection and/or extraction device, attaching for this purpose the interconnection element 16 of the device to the fluid inlet and/or outlet duct 8 of one of the valves 3b, through the hole in the cover 11. Aspiration is performed through this valve 3b until a certain level of vacuum is achieved. The extremity of the fluid inlet and/or outlet duct 8 incorporates the filter 29 in order to filter the air extracted and to eliminate the dust particles it may contain.

Next, or simultaneously, while maintaining the interconnection element 16 of the injection device coupled to the fluid inlet and/or outlet duct 8 of another valve 3a, gas or any other fluid is injected into the internal space of the container 1.

Both the injection of gas and the extraction of air are carried out under the supervision of a processing and control unit which receives information from an in-line analysis unit about the internal atmosphere of the container 1. This analysis is carried out on a sample of gas obtained directly through one of the two valves 3a, 3b, by means of the insertion of a probe (not portrayed). This probe may be disposed at the interconnection element 16 of the injection device or be a part of an independent measuring device. Once the processing and control unit verifies that the concentration of the atmosphere is as desired, injection is halted and the valves 3a, 3b are closed.

In accordance with the second embodiment of the valve, wherein the interconnection element 16 of the injection device is coupled to the extremity of the fluid inlet and/or outlet duct 8, it is possible to foresee a detection means (not portrayed) on the body of the cover 11 disposed to detect the presence of said interconnection element 16. These detection means may be configured to send a halt signal to a processing and control unit of the injection device when the interconnection element 16 is detached from the duct 8. Thus, the treatment of the goods may be carried out in complete safety for the user.

In spite of the fact that reference has been made to a specific embodiment of the invention, it will be evident to a person skilled in the art that the valve and container described are susceptible to multiple variations and modifications, and that all the details mentioned may be replaced by other technically equivalent details without straying from the scope of protection defined by the attached claims. For example, although the embodiment described and portrayed in the figures relates to a container comprising a protective wrapping and formed by a sheet of flexible material, the valve claimed could also be applied to a container with a protective wrapping of cardboard, which would likewise be clamped between the cover and the valve seating. However, in the first embodiment of the valve, the projections and recesses of the cover and the seating would have to be of greater length in order to traverse a sheet of cardboard with a thickness of between 7 and 12 mm.

The invention claimed is:

1. A container for the treatment and/or storage of goods, the container comprising:
   an internal liner bag made of at least one sheet of a flexible material, and a protective wrapping for said internal liner bag;
   at least one fluid injection and/or extraction valve including a fluid inlet and/or outlet duct provided with a flowrate regulator element;
   a valve seating comprising a surface configured for being attached to a portion of the internal liner bag; and
   a cover for covering said valve seating, said cover being provided with an access hole configured for accessing said fluid inlet and/or outlet duct,
   wherein the at least one fluid injection and/or extraction valve includes the valve seating;
   wherein the fluid inlet and/or outlet duct is dimensioned to receive an interconnection element through the access hole for interconnecting with a fluid injection and/or extraction device,
   wherein the cover includes one or more securing elements for securing the protective wrapping to said valve seating,
   wherein the portion of said internal liner bag is attached to the surface of the valve seating,
   wherein said one or more securing elements comprise a cover affixing body extending from a lower side of the cover to enter into contact with a portion of the protective wrapping disposed over the valve seating, said cover affixing body comprising an anchoring element arranged to cooperate with a complementary anchoring element,
   wherein the protective wrapping is secured to the valve seating by the cover affixing body contacting said portion of the protective wrapping and clamping said portion of the protective wrapping between the valve seating and the cover to hold the protective wrapping against the valve seating during handling of the container, and
   wherein the fluid inlet and/or outlet duct comprises an anchoring element for the interconnection element.

2. The container according to claim 1, wherein said fluid inlet and/or outlet duct is attached to the valve seating such that one extremity of the fluid inlet and/or outlet duct emerges from an upper side of the valve seating to become disposed in correspondence with the access hole in the cover, the one extremity of said fluid inlet and/or outlet duct comprises the complementary anchoring element in the form of a ring-shaped flange that cooperates with the anchoring element by clipping to the anchoring element of the cover affixing body to secure the protective wrapping to the valve seating.

3. The container, according to claim 1, wherein the portion of said internal liner bag is attached to the surface of the valve seating by welding, and the valve seating is disposed coaxially to said fluid inlet and/or outlet duct, said portion of the internal liner bag being susceptible to be covered by the cover while the protective wrapping is secured to the valve seating by the securing elements of said cover.

4. The container, according to claim 1, wherein the at least one sheet of flexible material of said internal liner bag comprises at least one layer or sheet of flexible material with a permeability configured to maintain the composition of the atmosphere within the container substantially constant during a predetermined time.

5. The container, according to claim 1, wherein said at least one sheet of flexible material of said internal liner bag comprises at least one layer or sheet made of polyethylene and/or at least one layer or sheet of polyamide, either said at least one layer or sheet of polyethylene or said at least one layer or sheet of polyamide being configured to be welded to the valve seating.

6. The container, according to claim 1, wherein said protective wrapping includes at least one layer of fabric made of synthetic or natural fibres.

7. The container, according to claim 1, wherein said protective wrapping includes at least one layer of cellulose material.

8. The container, according to claim 1, comprising a plug arranged to seal the access hole in the cover and block access to the fluid inlet and/or outlet duct.

9. The container, according to claim 1, wherein the cover comprises a portion with a substantially concave profile arranged coaxially to the access hole, said portion of the cover with the substantially concave profile being configured to enable an extended edge of the cover to enter into contact with the protective wrapping to secure it against the internal liner bag.

10. The container according to claim 1, wherein said flowrate regulator element comprises a membrane made of an elastometric material and having one or more elements arranged to be removably attached to an internal wall within the fluid inlet and/or outlet duct, said membrane being configured to block a hole in said internal wall and prevent flow of a fluid.

* * * * *